US009036015B2

(12) United States Patent
Verburgh et al.

(10) Patent No.: US 9,036,015 B2
(45) Date of Patent: May 19, 2015

(54) RENDERING VIEWS FOR A MULTI-VIEW DISPLAY DEVICE (75) Inventors: Reinout Verburgh, Brugge (BE); Ralph Braspenning, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1389 days.

(21) Appl. No.: 12/094,628

(22) PCT Filed: Nov. 17, 2006

(86) PCT No.: PCT/IB2006/054315
§ 371 (c)(1),
(2), (4) Date: May 22, 2008

(87) PCT Pub. No.: WO2007/060584
PCT Pub. Date: May 31, 2007

(65) Prior Publication Data
US 2008/0309756 A1 Dec. 18, 2008

(30) Foreign Application Priority Data
Nov. 23, 2005 (EP) .................... 05111127

(51) Int. Cl.
*H04N 13/04* (2006.01)
*H04N 7/12* (2006.01)
(Continued)

(52) U.S. Cl.
CPC ............. *G06T 7/20* (2013.01); *H04N 13/0445* (2013.01); *H04N 2013/0085* (2013.01); *H04N 13/0011* (2013.01); *H04N 13/0282* (2013.01); *G06T 3/40* (2013.01)

(58) Field of Classification Search
CPC ............. G02B 27/225; H04N 13/0402; H04N 13/0456; H04N 13/0239; H04N 13/0055; H04N 2013/0081; H04N 13/0011; H04N 13/0282; H04N 13/0445; H04N 2013/0085; G06T 7/20; G06T 3/40
USPC ........ 348/44, 46, 52, 55, 412.1, 413.1, 415.1, 348/416.1, 54, 59
See application file for complete search history.

(56) References Cited

U.S. PATENT DOCUMENTS 5,534,946 A     7/1996  De Haan et al.
5,619,256 A  *  4/1997  Haskell et al. .................. 348/43
(Continued)

FOREIGN PATENT DOCUMENTS

EP   0577165 A1   1/1994
EP   0650145 A2   4/1995
(Continued)

OTHER PUBLICATIONS

Sullivan, A.: "A Solid-State Multi-Planar Volumetric Display"; SID 2003 Digest, pp. 1531-1533.
(Continued)

*Primary Examiner* — Gregory Todd (57) ABSTRACT

A method of rendering views for a multi-view display device (100) is disclosed. The multi-view display device (100) comprises a number of display means (104, 110) for displaying respective views in mutually different directions relative to the multi-view display device (100). The method comprises: computing a first motion vector field on basis of a first input image of a time sequence of input images and a second input image of the time sequence of input images; computing a first motion compensated intermediate image on basis of the first motion vector field, the first input image and/or the second input image; and providing the first motion compensated intermediate image to a first one of the number of display means (104, 110).

10 Claims, 6 Drawing Sheets (51) Int. Cl.
*G06T 7/20* (2006.01)
*H04N 13/02* (2006.01)
*G06T 3/40* (2006.01)
*H04N 13/00* (2006.01)

(56) References Cited

U.S. PATENT DOCUMENTS

| | | | |
|---|---|---|---|
| 5,710,875 A | 1/1998 | Harashima et al. | |
| 5,739,844 A | 4/1998 | Kuwano et al. | |
| 5,986,804 A | 11/1999 | Mashitani et al. | |
| 6,064,424 A | 5/2000 | Van Berkel et al. | |
| 6,069,650 A | 5/2000 | Battersby | |
| 6,437,915 B2 | 8/2002 | Moseley et al. | |
| 6,625,333 B1* | 9/2003 | Wang et al. | 382/300 |
| 6,760,488 B1 | 7/2004 | Moura et al. | 382/285 |
| 6,771,704 B1* | 8/2004 | Hannah | 375/240.16 |
| 6,929,369 B2 | 8/2005 | Jones | 353/10 |
| 7,009,606 B2 | 3/2006 | Hiraga et al. | 345/421 |
| 7,184,071 B2 | 2/2007 | Chellappa et al. | 348/46 |
| 7,321,374 B2* | 1/2008 | Naske | 345/647 |
| 7,469,074 B2* | 12/2008 | Adams et al. | 382/284 |
| 7,856,055 B2* | 12/2010 | Zhou et al. | 375/240.12 |
| 8,619,198 B1* | 12/2013 | Andreev | 348/701 |
| 8,644,386 B2* | 2/2014 | Ha | 375/240.16 |
| 2002/0008917 A1* | 1/2002 | Daniell | 359/622 |
| 2004/0095999 A1* | 5/2004 | Piehl et al. | 375/240.16 |
| 2004/0252756 A1 | 12/2004 | Smith et al. | |
| 2008/0007614 A1* | 1/2008 | Mizuhashi et al. | 348/14.01 |

FOREIGN PATENT DOCUMENTS

| | | |
|---|---|---|
| JP | H03263989 A | 11/1991 |
| JP | 6054302 A | 2/1994 |
| JP | 7210686 A | 8/1995 |
| JP | H07287772 A | 10/1995 |
| JP | 2005268912 A | 9/2005 |
| WO | WO0188852 A2 | 11/2001 |
| WO | WO03015424 A2 | 2/2003 |

OTHER PUBLICATIONS

McAllister, D.: "Stereo Computer Graphics and Other True 3D Technologies"; Princeton University Press, 1993, Chapter 6 Entitled "Liquid-Crystal Shutter Systems for Time-Multiplexed Stereoscopic Displays"; pp. 91-118.

Eichenlaub, J.: A Lightweight, Compact 2D/3D Autosteroscopic LCD Backlight for Games, Monitor, and Notebook Applications, Proceedings of SPIE, vol. 3012, pp. 274-281.

De Hann et al: "True-Motion Estimation With 3-D Recursive Search Block Matching"; IEEE Transactions on Circuits and Systems for Video Tehcnology, vol. 3, No. 5, Oct. 1996, pp. 368-379.

Finch: Synthesis of Three-Dimensional Image From a Moving Monocular Information Field; IBM Technical Disclosure Bulletin, vol. 23, No. 6, Nov. 1980.

* cited by examiner

RENDERING VIEWS FOR A MULTI-VIEW DISPLAY DEVICE

The invention relates to a method of rendering views for a multi-view display device, the multi-view display device having a number of display means for displaying respective views in mutually different directions relative to the multi-view display device.

The invention further relates to such a multi-view display device.

The invention further relates to a computer program product to be loaded by a computer arrangement, comprising instructions to render views for a multi-view display device, the computer arrangement comprising processing means and a memory.

Since the introduction of display devices, a realistic three-dimensional (3D) display device has been a dream for many years. Many principles that should lead to such a display device have been investigated. Some principles try to create a realistic 3D object in a certain volume. For instance, in the display device as disclosed in the article "Solid-state Multi-planar Volumetric Display", by A. Sullivan in proceedings of SID'03, 1531-1533, 2003, information is displaced at an array of planes by means of a fast projector. Each plane is a switchable diffuser. If the number of planes is sufficiently high the human brain integrates the picture and observes a realistic 3D object. This principle allows a viewer to look around the object within some extent. In this display device all objects are (semi-) transparent.

Many others try to create a 3D display device based on binocular disparity only. In these systems the left and right eye of the viewer perceive another image and consequently, the viewer perceives a 3D image. An overview of these concepts can be found in the book "Stereo Computer Graphics and Other True 3D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3D without the need for additional appliances are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different views in his left and right eye if he is positioned at the correct spot, and is able to perceive a 3D picture.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See for instance U.S. Pat. No. 5,986,804 where a barrier plate is combined with a red and green led. In case the viewer is well positioned he sees a green light, and a red light otherwise.

To relieve the viewer of sitting at a fixed position, multi-view auto-stereoscopic display devices have been proposed. See for instance U.S. Pat. No. 6,064,424 and US20000912. In the display devices as disclosed in U.S. Pat. No. 6,064,424 and US20000912 a slanted lenticular is used, whereby the width of the lenticular is larger than two sub-pixels. In this way there are several views next to each other and the viewer has some freedom to move to the left and right.

A drawback of auto-stereoscopic display devices is the resolution loss incorporated with the generation of 3D images. It is advantageous that those display devices are switchable between a (two-dimensional) 2D and 3D mode, i.e. a single-view mode and a multi-view mode. If a relatively high resolution is required, it is possible to switch to the single view mode since that has higher resolution.

An example of such a switchable display device is described in the article "A lightweight compact 2D/3D autostereoscopic LCD backlight for games, monitor and notebook applications" by J. Eichenlaub in proceedings of SPIE 3295, 1998. It is disclosed that a switchable diffuser is used to switch between a 2D and 3D mode. Another example of a switchable auto-stereoscopic display device is described in WO2003015424 where LC based lenses are used to create a switchable lenticular. See also U.S. Pat. No. 6,069,650.

In order to visualize 3-D images, the display device must be provided with the appropriate image data. Preferably, a multi-camera setup is used for the acquisition of the 3-D images. However in many cases normal 2D cameras have been used for the acquisition of image data. Several techniques exist for the conversion of 2-D image data into 3-D image data. Typically these techniques are based on analysis of the image content. The aim is then to estimate a depth map. A depth map contains for each point in the scene the distance to the camera. That means that depth values are estimated for the pixels of the 2-D image. Several cues are known for that estimation, e.g. sharpness, color, luminance, size of objects, and junctions of contours of objects, etcetera.

Once the depth map belonging to a 2-D image is computed a number of views can be rendered which together form a 3-D image. This rendering is typically based on applying transformations of the 2-D image to compute the respective driving images for driving the display device in order to create the views, whereby the transformations are based on the estimated depth map.

Depth map heuristics commonly result in more or less a segmentation of the scene. Creating (sensible) depth differences within a segment is not easy. As a result, the viewer might get the impression as if he is looking at cardboards.

It is also not easy to make the depth maps temporally stable, which results in annoying fluctuations in the sequence of 3-D images. Also, more extreme views, i.e. views relatively far away from the center view, are very susceptible to mistakes and variations in the depth map.

It is an object of the invention to provide an alternative method of the kind described in the opening paragraph, which results in relatively high quality 3-D images.

This object of the invention is achieved in that the method comprises:
- computing a first motion vector field on basis of a first input image of a time sequence of input images and a second input image of the time sequence of input images;
- computing a first motion compensated intermediate image on basis of the first motion vector field, the first input image and/or the second input image; and
- providing the first motion compensated intermediate image to a first one of the number of display means.

In the method according to the invention, the driving images, i.e. the images to be provided to the display means are based on temporal interpolation. Simply said, multiple driving images having different temporal positions are mapped into a single 3-D image, whereby at least one of the multiple driving images is directly based on temporal interpolation of the time sequence of input images. Temporal interpolation means that pixel values from the first input image and/or the second input image are fetched and/or projected on basis of respective motion vectors being computed on basis of the first and second input image and on basis of the required temporal position between the first input image and the second input image. That means e.g. that the first motion compensated intermediate image is computed for a first time instance, i.e. temporal position, which is intermediate to the first input image and the second input image of the time sequence of input images.

There is no need for analysis of the actual input image contents, such as size and position of objects, in order to create a depth map. The intermediate image has a temporal relation with the first input image and the second input image. That means that motion for groups of pixels, preferably blocks of pixels, is estimated on basis of the first input image and the second input image and subsequently the first motion compensated image is directly computed by means of temporal interpolation. The temporal interpolation is performed on basis of the estimated motion vector field and the required temporal position, i.e. time instance.

An embodiment of the method according to the invention, further comprises:
  computing a second motion vector field for a second time instance which is different from a first time instance corresponding to the first motion vector field;
  computing a second motion compensated intermediate image on basis of the second motion vector field, the first input image and/or the second input image; and
  providing the second motion compensated intermediate image to a second one of the number of display means, substantially simultaneously with providing the first motion compensated intermediate image to the first one of the number of display means.

As said above, multiple driving images having different temporal positions are mapped into a single 3-D image and shown substantially simultaneously. In this embodiment, the second one of the multiple driving images is also based on temporal interpolation using a second motion vector field, whereby the second motion vector field differs from the first motion vector field. The second motion vector field may be computed on basis of the first motion vector field. This is called re-timing. This is for instance disclosed in WO01/88852.

An embodiment of the method according to the invention, further comprises:
  computing a third motion vector field on basis of the second input image and a third input image of the time sequence of input images;
  computing a third motion compensated intermediate image on basis of the third motion vector field, the second input image and/or the third input image; and
  providing the third motion compensated intermediate image to a third one of the number of display means, substantially simultaneously with providing the first motion compensated intermediate image to the first one of the number of display means.

The single 3-D image may comprise motion compensated intermediate images, which are based on a single pair of input images. But preferably, the single 3-D image also comprises motion compensated intermediate images, which are based on multiple pairs of input images. In this embodiment of the method according to the invention, a single 3-D image is created by providing a first motion compensated intermediate image and a third motion compensated intermediate image, whereby the first motion compensated intermediate image is based on a first pair of input images and the third motion compensated intermediate image which is based on a second pair of input images. The first pair and second pair partly overlap. An advantage of this embodiment according to the invention is that a relatively strong depth impression can be created. Another advantage is that reuse of intermediate images is possible. That can be achieved by applying for instance the third intermediate image to create a first 3-D image and a consecutive second 3-D image.

An embodiment of the method according to the invention further comprises providing the first input image to a fourth one of the number of display means substantially simultaneously with providing the first motion compensated intermediate image to the first one of the number of display means. Preferably, the input images of the time sequence of input images are directly used to render views of the 3-D image. Besides providing the first input image it is also beneficial to provide the second input image too.

An embodiment of the method according to the invention further comprises computation of a current time interval being the required temporal distance between two adjacent intermediate images, on basis of estimated motion. As said above, multiple driving images having different temporal positions are shown substantially simultaneously and hence mapped into a single 3-D image. Each of the multiple driving images has its temporal position. A difference between two temporal positions is a temporal distance. This temporal distance is preferably not constant as function of time but computed on basis of the time sequence of input images. This temporal distance is preferably constant for the driving images of a 3D-image.

With adjacent is meant that the driving images are direct temporal neighbors, i.e. in the time domain. Typically, but not necessarily, "adjacent" also means that the adjacent driving images are mapped to display means, which have adjacent angular directions relative to each other.

Suppose that a single 3-D image comprises nine views. A possible mapping to the nine views could be as follows. The first input image is mapped to the first view, the second input image is mapped to the ninth view and seven intermediate images, being temporally equidistantly positioned between the first input image and the second input image, are mapped to the seven remaining views. An alternative mapping could be as follows. The first input image is mapped to the first view, the second input image is mapped to the fifth view, the third input image is mapped to the ninth view, three intermediate images which are based on the first input image and the second input image are mapped to view numbers two, three and four and three other intermediate images which are based on the second input image and the third input image are mapped to view numbers six, seven and eight. It will be clear that the temporal distance, i.e. the time difference between adjacent driving images, in the latter case is twice as large as in the former case.

If the estimated motion, preferably based on an average of the motion vectors of one of the motion vector fields, is relatively low then the temporal distance is relatively large. If the estimated motion is relatively high then the temporal distance is relatively small.

Although, the current time interval, i.e. the temporal distance is preferably not constant, it is preferred that the temporal distance as function of time changes smoothly. Typically that means that the current temporal distance is based on a previously computed temporal distance. By changing the temporal distance smoothly, also the depth impression is adapted smoothly. Notice that, the added depth impression, which is achieved by the method according to the invention, is primarily based on motion in the time sequence of input images. To prevent that the added depth impression changes abruptly, sudden changes in the motion are smoothed.

An embodiment of the method according to the invention, further comprises:

provjding the first motion compensated intermediate image to the second one of the number of display means after a predetermined delay. An advantage is that reuse is made of motion compensated intermediate images. That can be achieved by applying for instance the first motion compensated intermediate image to create a first 3-D image and a consecutive second 3-D image. Typically this works as follows. Suppose that the display device has nine views. That means that a single 3-D image has nine views. To display a first 3-D image nine driving images are provided of which two are based on input images as received and seven driving images are motion compensated intermediate images. To display a subsequent second 3-D image e.g. three new motion compensated intermediate images are computed and six of the driving images as used for the first 3-D image, are reused. It will be clear that for the creation of the second 3-D image a re-mapping of driving images is needed. Typically, the remapping comprises shifting. For instance, in this example the intermediate image that was provided to the display means corresponding to the sixth view of the first 3-D image will be provided to the display means corresponding to the third view of the second 3-D image.

Preferably, the predetermined delay, after which the first motion compensated intermediate image is provided to the second one of the number of display means, is shorter than the temporal distance between the first and second input image. This embodiment of the method according to the invention combines conversion of 2-D input images into a 3-D images with temporal up conversion in order to increase the display frequency compared to the frequency of the time sequence of input images. Hence, an advantage of this embodiment is reduced large area flicker and motion judder removal. Notice that the computation of motion compensated intermediate images is performed for two goals in this embodiment:

to create motion compensated intermediate images to be displayed substantially simultaneously for enhanced 3-D impression; and to create motion compensated intermediate images to be displayed with a display frequency which is higher than the input frequency of the time sequence of input images, for enhanced motion portrayal.

It is a further object of the invention to provide a multi-view display device of the kind described in the opening paragraph, which is arranged to display relatively high quality 3-D images.

This object of the invention is achieved in that the multi-view display device comprises:

a motion estimation unit for computing a first motion vector field on basis of a first input image of a time sequence of input images and a second input image of a time sequence of input images;

an interpolation unit for computing a first motion compensated intermediate image on basis of the first motion vector field, the first input image and/or the second input image; and driving means for providing the first motion compensated intermediate image to a first one of the number of display means.

It is a further object of the invention to provide a computer program product of the kind described in the opening paragraph, which results in relatively high quality 3-D images.

This object of the invention is achieved in that the computer program product, after being loaded, provides said processing means with the capability to carry out:

computing a first motion vector field on basis of a first input image of a time sequence of input images and a second input image of the time sequence of input images;

computing a first motion compensated intermediate image on basis of the first motion vector field, the first input image and/or the second input image; and providing the first motion compensated intermediate image to a first one of the number of display means.

Modifications of the multi-view display device and variations thereof may correspond to modifications and variations thereof of the method and the computer program product, being described.

These and other aspects of the multi-view display device, according to the invention will become apparent from and will be elucidated with respect to the implementations and embodiments described hereinafter and with reference to the accompanying drawings, wherein:

Same reference numerals are used to denote similar parts throughout the Figures.

Figure 1:
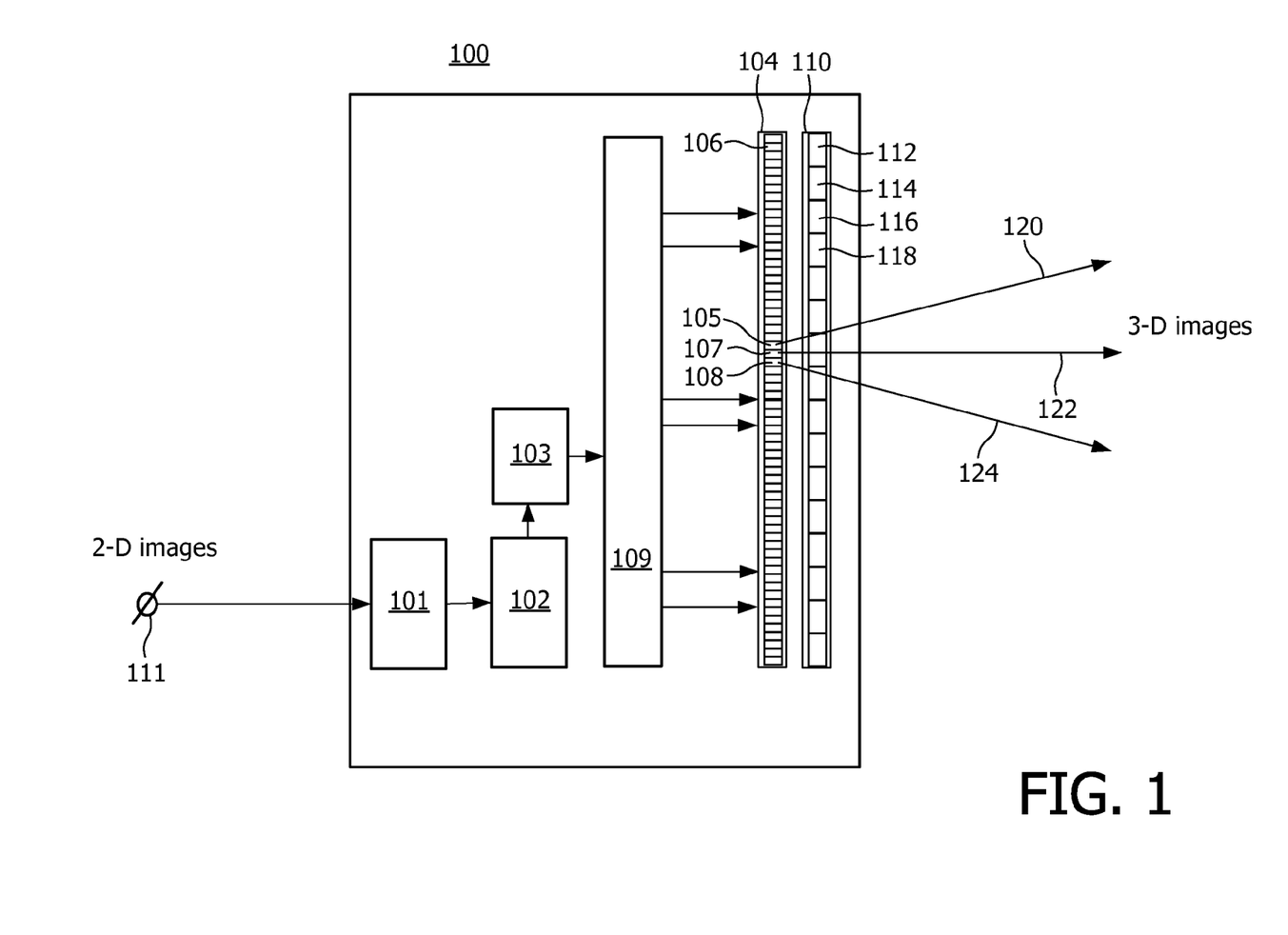
FIG. 1 schematically shows an embodiment of the multi-view display device according to the invention.

FIG. 1 schematically shows an embodiment of the multi-view display device 100 according to the invention. The multi-view display device is arranged to display a number of views in mutually different directions 120, 122, 124 relative to the multi-view display device 100. The multi-view display device 100 is a so-called autostereoscopic display device. That means that the user does not have to wear special glasses to separate the views. The views are based on a signal that is provided at the input connector 111. The signal represents a time sequence of input images.

The multi-view display device 100 comprises:

receiving means 101 for receiving the information signal. The information signal may be a broadcast signal received via an antenna or cable but may also be a signal from a storage device like a VCR (Video Cassette Recorder) or Digital Versatile Disk (DVD). The information signal may also be provided by a PC (personal computer) or some other multimedia device;

a motion estimation unit 102 for computing motion vector fields on basis of the input images;

an interpolation unit 103 for computing motion compensated intermediate images on basis of the motion vector fields and input images;

driving means 109 for providing driving images, i.e. motion compensated intermediate images and optionally input images, to a number of display means 104, 110, whereby the display means 104,110 comprise:

a structure 104 of light generating elements 105-108 for generating light on basis of respective pixel values of the driving images as provided to the structure 104 of light generating elements 105-108; and optical directory means 110 for directing the generated light in different directions 120, 122, 124 relative to the multi-view display device 100

The structure 104 of light generating elements 105-108 are located in a first plane and the optical directory means 110 comprises a group of optical directory elements 112-118 each of which is associated with a respective group of light generating elements 105-108. The optical directory means 110 overlay the light generating elements 105-108 in the first plane for directing the outputs of the light generating elements 105-108 in mutually different angular directions relative to the first plane.

The structure 104 of light generating elements 105-108 may be an LCD, CRT, PDP or an alternative display screen. Preferably, the display frequency of the display screen is relatively high, e.g. above 50 Hz.

Preferably the optical directory means 110 comprises a set of lenses 112-118. The optical directory means 110 are e.g. as disclosed in U.S. Pat. No. 6,069,650.

Alternatively the optical directory means 110 comprises a set of barriers 112-118. The optical directory means 110 are e.g. as disclosed in U.S. Pat. No. 6,437,915.

The receiving means 101, the motion estimation unit 102, the interpolation unit 103 and the driving means 109 may be implemented using one processor. Normally, these functions are performed under control of a software program product. During execution, normally the software program product is loaded into a memory, like a RAM, and executed from there. The program may be loaded from a background memory, like a ROM, hard disk, or magnetical and/or optical storage, or may be loaded via a network like Internet. Optionally an application specific integrated circuit provides the disclosed functionality.

The motion estimation unit 102 is e.g. as specified in the article "True-Motion Estimation with 3-D Recursive Search Block Matching" by G. de Haan et al. in IEEE Transactions on circuits and systems for video technology, vol. 3, no. 5, October 1993, pages 368-379.

The interpolation unit 103 is preferably as disclosed in U.S. Pat. No. 5,534,946.

The working of the multi-view display device 100 is as follows. At the input connector 111 a signal is provided which represents a time sequence of input images. On basis of temporal interpolation of the input images additional images are created. These additional images are temporally located intermediate, i.e. in between the subsequent input images of the time sequence of input images. Hence these additional images are called motion compensated intermediate images. The pixel values of the intermediate images and optionally the pixel values of some of the input images are provided to the structure 104 of light generating elements 105-108. The light generating elements generate light which is directed in mutually different directions relative to the first plane. The set of driving images, i.e. the motion compensated intermediate images and optionally the input images which are provided substantially simultaneously to the structure 104 of light generating elements 105-108, is called a 3-D image.

The output of a sub-set of the light generating elements which is addressed on basis of a single one of the driving images is called a view. For instance, suppose the multi-view display device is a nine view display device, then nine driving images are provided to the structure 104 of light generating elements 105-108. The complete structure 104 of light generating elements 105-108 can be considered as nine subsets of light generating elements. Such a sub-set of light generating elements and the associated optical directory means are the respective display means.

A viewer, who watches the display screen of the multi-view display device 100 from a suitable location, will see a first view with his left eye and a second view with his right eye. As a result of motion in the time sequence of input images the first view and the second view are different and hence the viewer will get a 3-D impression. With display screen of the multi-view display device is meant the layer in which the optical directory means 110 are located.

Figure 2:
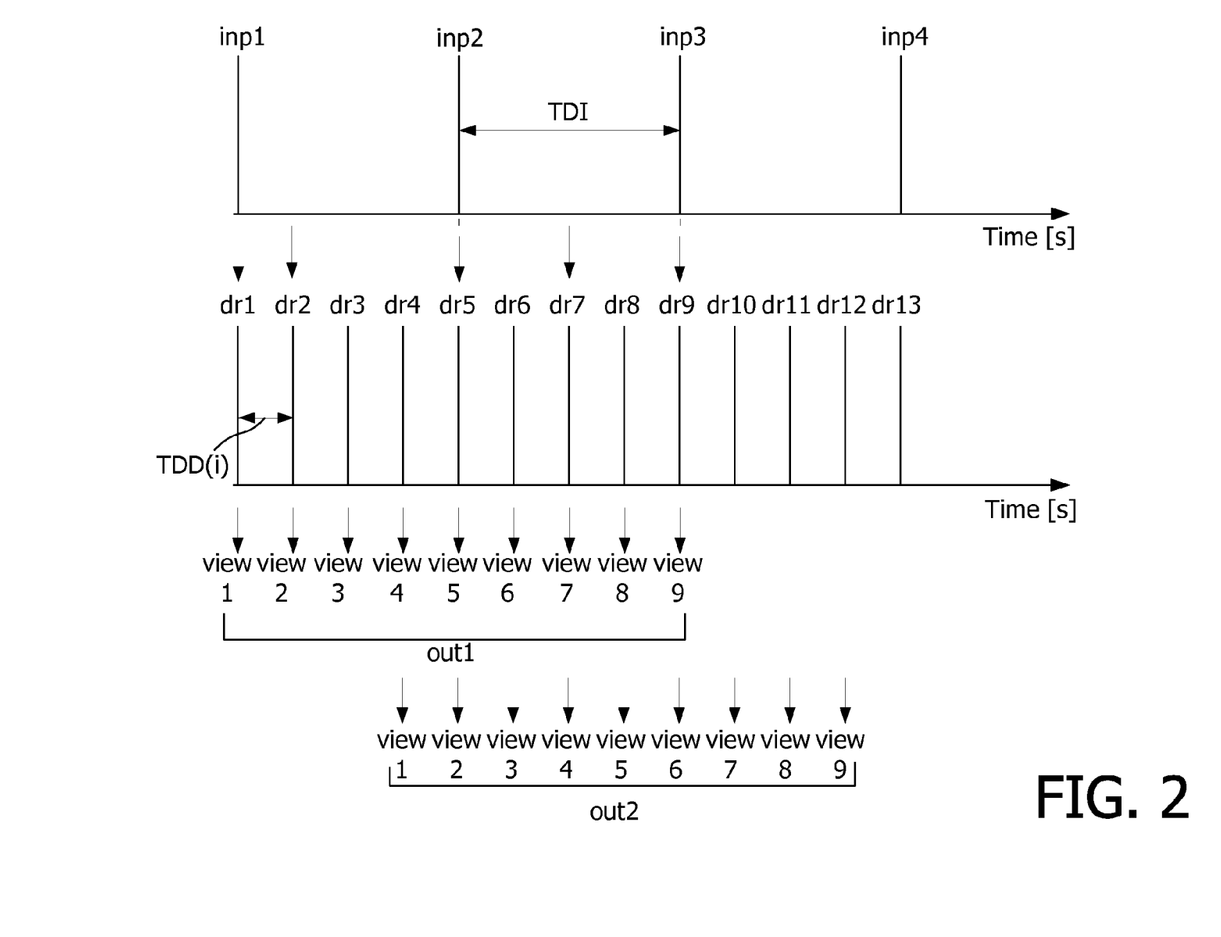
FIG. 2 schematically shows a time sequence of input images and a sequence of input images derived from that time sequence of input images.

FIG. 2 schematically shows a time sequence of input images inp1-inp4 and a sequence of driving images dr1-dr13 derived from that time sequence of input images inp1-inp4. The sequence of driving images dr1-dr13 is used to drive the structure 104 of light generating elements 105-108. The sequence of driving images dr1-dr13 comprises motion compensated intermediate images, which are computed by means of temporal interpolation of the input images inp1-inp4 and optionally comprises copies of the input images inp1-inp4.

Typically the time sequence of input images inp1-inp4 corresponds to video data. That means that the input images inp1-inp4 correspond to video frames. In FIG. 2 the time dimension is indicated by means of the horizontal arrows with annotation "Time". In the case of 25 Hz video frames, the temporal distance TDI (Temporal Distance Input) between subsequent input images, i.e. video frames, is $\frac{1}{25}$ second.

The temporal distance TDD(i) (Temporal Distance Driving) between subsequent driving images dr1-dr13 for a 3D-image with index i, is less then the temporal distance TDI between subsequent input images. Alternatively, one could speak about the temporal distance TDD(i) between "adjacent" driving images. In the example as depicted in FIG. 2 the relation between the temporal distances is specified in Equation 1:

$$TDI = 4*TDD(i) \quad (1)$$

However, notice that this is just an example.

A number of driving images together forms a 3-D image which can be observed by a viewer of the multi-view display device. In FIG. 2 is depicted that the driving images which are indicated with dr1-dr9 are combined into a first 3-D image out1 and that the driving images which are indicated with dr4-dr11 are combined into a subsequent second 3-D image out2. Notice that there is a strong overlap dr4-dr9 in the set of driving images dr1-dr9 which forms the first 3-D image out1 and the set of driving images dr4-dr11 which forms the second 3-D image out2.

In Table 1 below is indicated how the different driving images can be combined as function of time to create subsequent 3-D images. That means that Table 1 provides an example of mapping driving images to create respective views. Notice that also the time instances of substantially simultaneously displaying the views of the 3-D images are indicated in the first column of Table 1.

TABLE 1 first example of mapping driving images to create respective views.

| Time | 3-D image | view 1 | view 2 | view 3 | view 4 | view 5 | view 6 | view 7 | view 8 | view 9 |
|---|---|---|---|---|---|---|---|---|---|---|
| 0.00 | out1 | dr1 | dr2 | dr3 | dr4 | dr5 | dr6 | dr7 | dr8 | dr9 |
| 0.02 | out2 | dr2 | dr3 | dr4 | dr5 | dr6 | dr7 | dr8 | dr9 | dr10 |
| 0.04 | out3 | dr3 | dr4 | dr5 | dr6 | dr7 | dr8 | dr9 | dr10 | dr11 |

TABLE 1-continued first example of mapping driving images to create respective views.

| Time | 3-D image | view 1 | view 2 | view 3 | view 4 | view 5 | view 6 | view 7 | view 8 | view 9 |
|---|---|---|---|---|---|---|---|---|---|---|
| 0.06 | out4 | dr4 | dr5 | dr6 | dr7 | dr8 | dr9 | dr10 | dr11 | dr12 |
| 0.08 | out5 | dr5 | dr6 | dr7 | dr8 | dr9 | dr10 | dr11 | dr12 | dr13 |
| 0.10 | out6 | dr6 | dr7 | dr8 | dr9 | dr10 | dr11 | dr12 | dr13 | dr14 |
| 0.12 | out7 | dr7 | dr8 | dr9 | dr10 | dr11 | dr12 | dr13 | dr14 | dr15 |

Table 1 discloses that on time instance t=0.00 3-D image out1 is created by providing driving images dr1-dr9 to the number of display means, that on time instance t=0.02 3-D image out2 is created by providing driving images dr2-dr10 to the number of display means, etcetera.

The time delay between the subsequent output images out1-out7 is 0.02 second. Hence, the display frequency of the multi-view display device is 50 Hz. Table 1 clearly shows that there is reuse of driving images dr1-dr15. A particular driving image dr5 used for view 5 on time instance t=0.00, used for view 4 on time instance t=0.02, used for view 3 on time instance t=0.04, etcetera. Basically, Table 1 shows that the particular driving image is shifted from a first view to a second view, which is adjacent to the first view. Of the so-called view shift VS(i) equals 1 in this example.

TABLE 2 second example of mapping driving images to create respective views.

| Time | 3-D image | view 1 | view 2 | view 3 | view 4 | view 5 | view 6 | view 7 | view 8 | view 9 |
|---|---|---|---|---|---|---|---|---|---|---|
| 0.00 | out1 | dr1 | dr2 | dr3 | dr4 | dr5 | dr6 | dr7 | dr8 | dr9 |
| 0.04 | out2 | dr2 | dr3 | dr4 | dr5 | dr6 | dr7 | dr8 | dr9 | dr10 |
| 0.08 | out3 | dr3 | dr4 | dr5 | dr6 | dr7 | dr8 | dr9 | dr10 | dr11 |
| 0.12 | out4 | dr4 | dr5 | dr6 | dr7 | dr8 | dr9 | dr10 | dr11 | dr12 |
| 0.16 | out5 | dr5 | dr6 | dr7 | dr8 | dr9 | dr10 | dr11 | dr12 | dr13 |
| 0.20 | out6 | dr6 | dr7 | dr8 | dr9 | dr10 | dr11 | dr12 | dr13 | dr14 |
| 0.24 | out7 | dr7 | dr8 | dr9 | dr10 | dr11 | dr12 | dr13 | dr14 | dr15 |

Table 2 discloses that on time instance t=0.00 3-D image out1 is created by providing driving images dr1-dr9 to the number of display means, that on time instance t=0.04 3-D image out2 is created by providing driving images dr2-dr10 to the number of display means, etcetera.

The time delay between the subsequent output images out1-out7 is 0.04 second. Hence, the display frequency of the multi-view display device is 25 Hz. Table 2 shows that a particular driving image is shifted from a first view to a second view, which is adjacent to the first view. The view shift VS(i) equals 1 in this example.

By comparing the examples of Table 1 and Table 2 it becomes clear that with the multi-view display device according to the invention various display frequencies can be realized. The various display frequencies include frequencies which are higher than the input frequency, resulting in a so-called temporal conversion. Notice that directly displaying the time sequence of input images having an input frequency of 25 Hz will result in a different motion portrayal, than displaying the temporally up-converted sequence of driving images. The ratio between the display frequency and the input frequency is called the temporal up-conversion factor TupC.

TABLE 3 third example of mapping driving images to create respective views.

| Time | 3-D image | view 1 | view 2 | view 3 | view 4 | view 5 | view 6 | view 7 | view 8 | view 9 |
|---|---|---|---|---|---|---|---|---|---|---|
| 0.00 | out1 | dr1 | dr2 | dr3 | dr4 | dr5 | dr6 | dr7 | dr8 | dr9 |
| 0.02 | out2 | dr3 | dr4 | dr5 | dr6 | dr7 | dr8 | dr9 | dr10 | dr11 |
| 0.04 | out3 | dr5 | dr6 | dr7 | dr8 | dr9 | dr10 | dr11 | dr12 | dr13 |
| 0.06 | out4 | dr7 | dr8 | dr9 | dr10 | dr11 | dr12 | dr13 | dr14 | dr15 |

TABLE 3-continued third example of mapping driving images to create respective views.

| Time | 3-D image | view 1 | view 2 | view 3 | view 4 | view 5 | view 6 | view 7 | view 8 | view 9 |
|---|---|---|---|---|---|---|---|---|---|---|
| 0.08 | out5 | dr9 | dr10 | dr11 | dr12 | dr13 | dr14 | dr15 | dr16 | dr17 |
| 0.10 | out6 | dr11 | dr12 | dr13 | dr14 | dr15 | dr16 | dr17 | dr18 | dr19 |
| 0.12 | out7 | dr13 | dr14 | dr15 | dr16 | dr17 | dr18 | dr19 | dr20 | dr21 |

Table 3 discloses that on time instance t=0.00 3-D image out1 is created by providing driving images dr1-dr9 to the number of display means, that on time instance t=0.02 3-D image out2 is created by providing driving images dr3-dr11 to the number of display means, etcetera.

The time delay between the subsequent output images out1-out7 is 0.02 second. Hence, the display frequency of the multi-view display device is 50 Hz. Table 3 shows that a particular driving image is shifted from a first view to a second view, which is adjacent to the first view. The view shift VS(i) equals 2 in this example.

By comparing the examples of Table 1 and Table 3 it becomes clear that the view shift VS is not constant but is configurable. By selecting the value of VS(i) and of TDD(i) the amount of depth impression can be set: increased/decreased.

As said, the driving images dr1-dr15 are based on the input images inp1-inp4. The computations of the driving images is as follows.

First, the required actual temporal distance TDD(i) between the subsequent driving images is determined, for the 3-D image to be created, indicated with index i. The required actual temporal distance TDD(i) between the subsequent driving images is based on the amount of motion and the temporal distance TDD(i−1), which was used for the previous 3-D image i−1.

Second, the temporal position TP(i, j=cv) of the driving image j corresponding to the central view (j=cv) of the multi-view display device is determined for 3-D image i. Preferably the central view is the view corresponding to the angular direction, which is substantially orthogonal to the display screen. The temporal position TP(i, j=cv) depends on the temporal position TP(i−1, j=cv) of the previous 3-D image i−1. Typically, the temporal position TP(i, j=cv) is also related to the temporal distance TDI between subsequent input images as specified in Equation 2 and the temporal up-conversion factor TupC:

$$TP(i, j = cv) = TP(i-1, j = cv) + \frac{TDI}{TupC} \quad (2)$$

Preferably, the temporal position TP(i, j=cv) of the driving image j corresponding to the central view (j=cv) corresponds to a time instance of one of the input images. That means that, preferably the driving image j corresponding to the central view is a copy of one of the input images. It will be clear that with a temporal up conversion factor TupC which is not equal to one a number of driving image j corresponding to the central view (j=cv) cannot be copies of the input images. In that case, it is preferred that a maximum number of driving images corresponding to the central view are copies of the input images.

Third, the temporal positions TP(i, j) of the rest of the driving images j is computed. These temporal positions TP(i, j) are related to the number of views N, i.e. number of driving images for the 3-D image i. Equation 3 specifies how the temporal positions TP(i, j) are computed:

$$TP(i,j)=TP(i,j=cv)+(j-cv)*TDD(i) \quad (3)$$

Typically, the value of the central view $$cv = \frac{N+1}{2},$$

e.g. with nine views the value of the central view cv=5.

$$TP(i, j) = TP(i, j = cv) + \left(j - \frac{N+1}{2}\right) * TDD(i) \quad (4)$$

On basis of the temporal positions TP(i, j) the driving images are computed. Preferably, the input images, which are relatively close to the temporal positions of the driving images, will be used for that. For example driving image dr2 in FIG. 2 will be based on input image inp1 and input image inp2, while driving image dr7 will be based on input image inp2 and input image inp3.

If the actual temporal distance TDD(i) is equal to the previous temporal distance TDD(i−1) reuse of a previously computed driving images can be made as explained in connection with Table 1, 2 and 3. See also FIG. 5.

Table 4 gives a fourth example of mapping driving images to create respective views. In Table 4 the temporal instances for the different driving images and hence views are listed. The following applies: TDI=0.04, TupC=1.00, cv=5, TDD(i)= 0.01 constant.

TABLE 4 fourth example of mapping driving images to create respective views.

| 3-D image | view 1 | view 2 | view 3 | view 4 | view 5 | view 6 | view 7 | view 8 | view 9 | TDD(i) |
|---|---|---|---|---|---|---|---|---|---|---|
| out1 | 0.96 | 0.97 | 0.98 | 0.99 | 1.00 | 1.01 | 1.02 | 1.03 | 1.04 | 0.01 |
| out2 | 1 | 1.01 | 1.02 | 1.03 | 1.04 | 1.05 | 1.06 | 1.07 | 1.08 | 0.01 |
| out3 | 1.04 | 1.05 | 1.06 | 1.07 | 1.08 | 1.09 | 1.10 | 1.11 | 1.12 | 0.01 |
| out4 | 1.08 | 1.09 | 1.1 | 1.11 | 1.12 | 1.13 | 1.14 | 1.15 | 1.16 | 0.01 |
| out5 | 1.12 | 1.13 | 1.14 | 1.15 | 1.16 | 1.17 | 1.18 | 1.19 | 1.20 | 0.01 |

TABLE 4-continued fourth example of mapping driving images to create respective views.

| 3-D image | view 1 | view 2 | view 3 | view 4 | view 5 | view 6 | view 7 | view 8 | view 9 | TDD(i) |
|---|---|---|---|---|---|---|---|---|---|---|
| out6 | 1.16 | 1.17 | 1.18 | 1.19 | 1.2 | 1.21 | 1.22 | 1.23 | 1.24 | 0.01 |
| out7 | 1.2 | 1.21 | 1.22 | 1.23 | 1.24 | 1.25 | 1.26 | 1.27 | 1.28 | 0.01 |

The view shift VS(i) equals 4 in this example.

Table 5 gives a fifth example of mapping driving images to create respective views. In Table 5 the temporal instances for the different driving images and hence views are listed. The following applies: TDI=0.04, TupC=2.00, cv=5, TDD(i)=0.01 constant.

So the difference compared to the fourth example as listed in Table 5 is the temporal up conversion factor TupC.

TABLE 5 fifth example of mapping driving images to create respective views.

| 3-D image | view 1 | view 2 | view 3 | view 4 | view 5 | view 6 | view 7 | view 8 | view 9 | TDD(i) |
|---|---|---|---|---|---|---|---|---|---|---|
| out1 | 0.96 | 0.97 | 0.98 | 0.99 | 1.00 | 1.01 | 1.02 | 1.03 | 1.04 | 0.01 |
| out2 | 0.98 | 0.99 | 1 | 1.01 | 1.02 | 1.03 | 1.04 | 1.05 | 1.06 | 0.01 |
| out3 | 1 | 1.01 | 1.02 | 1.03 | 1.04 | 1.05 | 1.06 | 1.07 | 1.08 | 0.01 |
| out4 | 1.02 | 1.03 | 1.04 | 1.05 | 1.06 | 1.07 | 1.08 | 1.09 | 1.10 | 0.01 |
| out5 | 1.04 | 1.05 | 1.06 | 1.07 | 1.08 | 1.09 | 1.10 | 1.11 | 1.12 | 0.01 |
| out6 | 1.06 | 1.07 | 1.08 | 1.09 | 1.1 | 1.11 | 1.12 | 1.13 | 1.14 | 0.01 |
| out7 | 1.08 | 1.09 | 1.1 | 1.11 | 1.12 | 1.13 | 1.14 | 1.15 | 1.16 | 0.01 |
| out8 | 1.1 | 1.11 | 1.12 | 1.13 | 1.14 | 1.15 | 1.16 | 1.17 | 1.18 | 0.01 |
| out9 | 1.12 | 1.13 | 1.14 | 1.15 | 1.16 | 1.17 | 1.18 | 1.19 | 1.20 | 0.01 |
| out10 | 1.14 | 1.15 | 1.16 | 1.17 | 1.18 | 1.19 | 1.20 | 1.21 | 1.22 | 0.01 |
| out11 | 1.16 | 1.17 | 1.18 | 1.19 | 1.2 | 1.21 | 1.22 | 1.23 | 1.24 | 0.01 |
| out12 | 1.18 | 1.19 | 1.2 | 1.21 | 1.22 | 1.23 | 1.24 | 1.25 | 1.26 | 0.01 |
| out13 | 1.2 | 1.21 | 1.22 | 1.23 | 1.24 | 1.25 | 1.26 | 1.27 | 1.28 | 0.01 |
| out14 | 1.22 | 1.23 | 1.24 | 1.25 | 1.26 | 1.27 | 1.28 | 1.29 | 1.30 | 0.01 |

The view shift VS(i) equals 2 in this example.

The actual temporal distance TDD(i) is a mathematical quantity, in that sense that it can be positive and negative. Table 6 gives a sixth example of mapping driving images to create respective views whereby the value of TDD(i) changes smoothly as function of time. The following applies: TDI=0.04, TupC=2.00, cv=5.

TABLE 6 gives a sixth example of mapping driving images to create respective views.

| 3-D image | view 1 | view 2 | view 3 | view 4 | view 5 | view 6 | view 7 | view 8 | view 9 | TDD(i) |
|---|---|---|---|---|---|---|---|---|---|---|
| out1 | 0.960 | 0.970 | 0.980 | 0.990 | 1.000 | 1.010 | 1.020 | 1.030 | 1.040 | 0.010 |
| out2 | 0.990 | 0.998 | 1.005 | 1.013 | 1.020 | 1.028 | 1.035 | 1.043 | 1.050 | 0.008 |
| out3 | 1.020 | 1.025 | 1.030 | 1.035 | 1.040 | 1.045 | 1.050 | 1.055 | 1.060 | 0.005 |
| out4 | 1.050 | 1.053 | 1.055 | 1.058 | 1.060 | 1.063 | 1.065 | 1.068 | 1.070 | 0.003 |
| out5 | 1.080 | 1.080 | 1.080 | 1.080 | 1.080 | 1.080 | 1.080 | 1.080 | 1.080 | 0.000 |
| out6 | 1.110 | 1.108 | 1.105 | 1.103 | 1.100 | 1.098 | 1.095 | 1.093 | 1.090 | −0.003 |
| out7 | 1.140 | 1.135 | 1.130 | 1.125 | 1.120 | 1.115 | 1.110 | 1.105 | 1.100 | −0.005 |
| out8 | 1.170 | 1.163 | 1.155 | 1.148 | 1.140 | 1.133 | 1.125 | 1.118 | 1.110 | −0.008 |
| out9 | 1.200 | 1.190 | 1.180 | 1.170 | 1.160 | 1.150 | 1.140 | 1.130 | 1.120 | −0.010 |
| out10 | 1.210 | 1.203 | 1.195 | 1.188 | 1.180 | 1.173 | 1.165 | 1.158 | 1.150 | −0.008 |
| out11 | 1.220 | 1.215 | 1.210 | 1.205 | 1.200 | 1.195 | 1.190 | 1.185 | 1.180 | −0.005 |
| out12 | 1.230 | 1.228 | 1.225 | 1.223 | 1.220 | 1.218 | 1.215 | 1.213 | 1.210 | −0.003 |
| out13 | 1.240 | 1.240 | 1.240 | 1.240 | 1.240 | 1.240 | 1.240 | 1.240 | 1.240 | 0 |
| out14 | 1.250 | 1.253 | 1.255 | 1.258 | 1.260 | 1.263 | 1.265 | 1.268 | 1.270 | 0.0025 |

Figure 6:
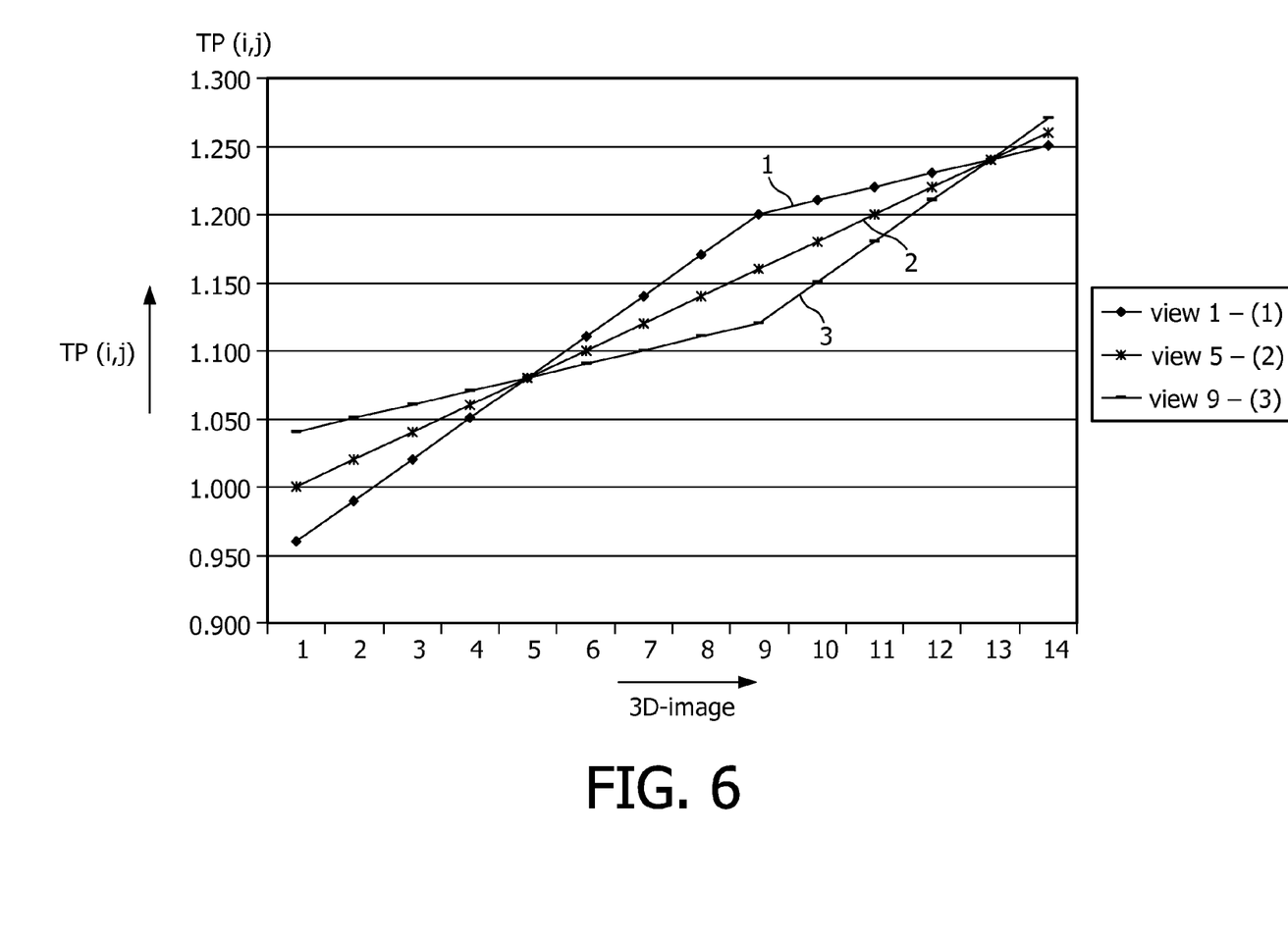
FIG. 6 illustrates the effect of changing TDD(i).

Table 6 shows the effect of changing TDD(i). This is also illustrated in FIG. 3, FIG. 4 and FIG. 6.

Figure 3:
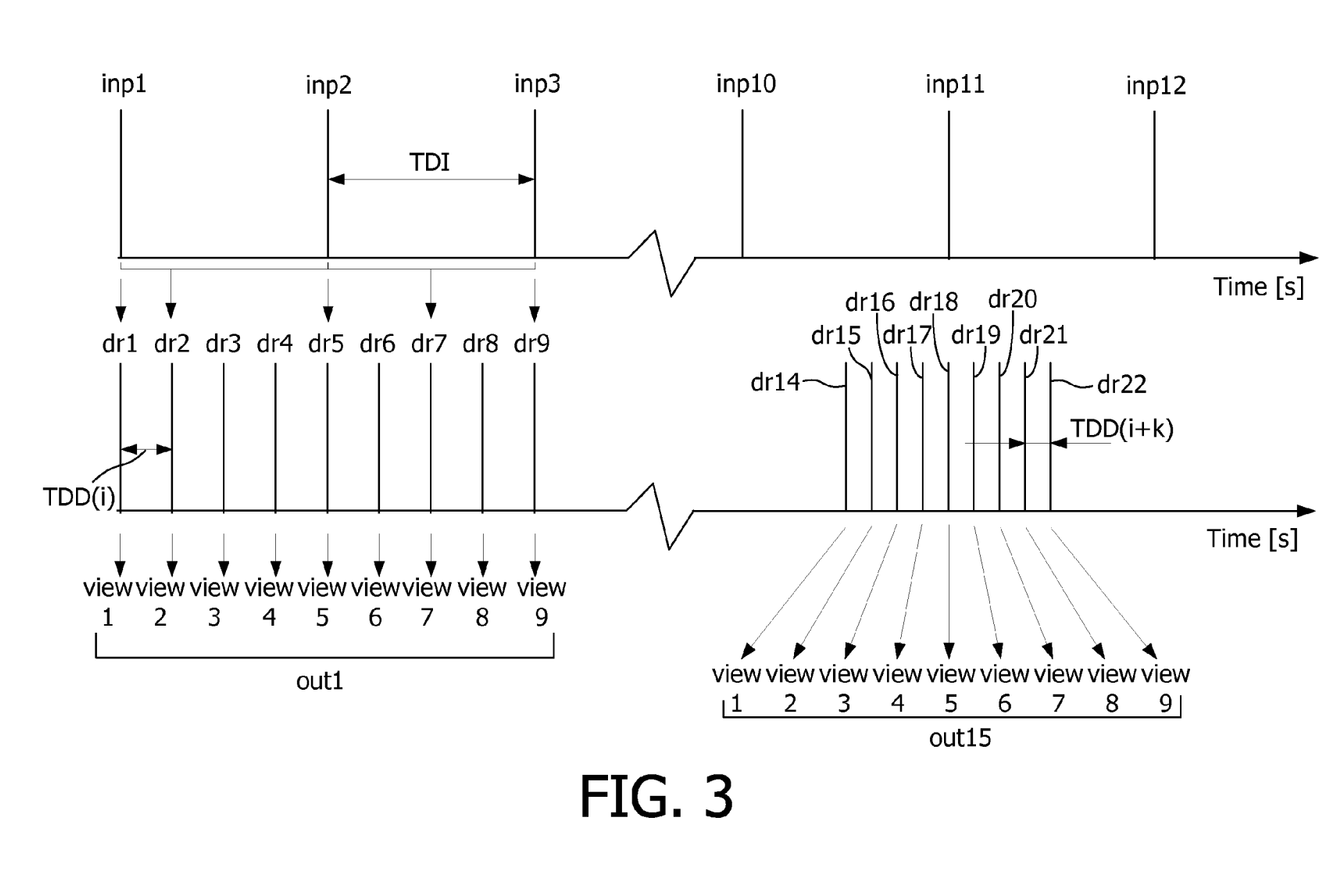
FIG. 3 illustrates the effect of decreased TDD(i)

FIG. 3 illustrates the effect of decreased TDD(i), i.e. TDD (i+k)<TDD(i) with k being an integer value. FIG. 3 shows that driving images dr1-dr9, which are based on input images inp1-inp3, are mapped to view1-view9 with $$TDD(i) = \frac{TDI}{4}.$$

Later on driving images dr14-dr22, which are based on input images, inp10-inp12 are mapped to view1-view9 with $$TDD(i) = \frac{TDI}{8}.$$

Figure 4:
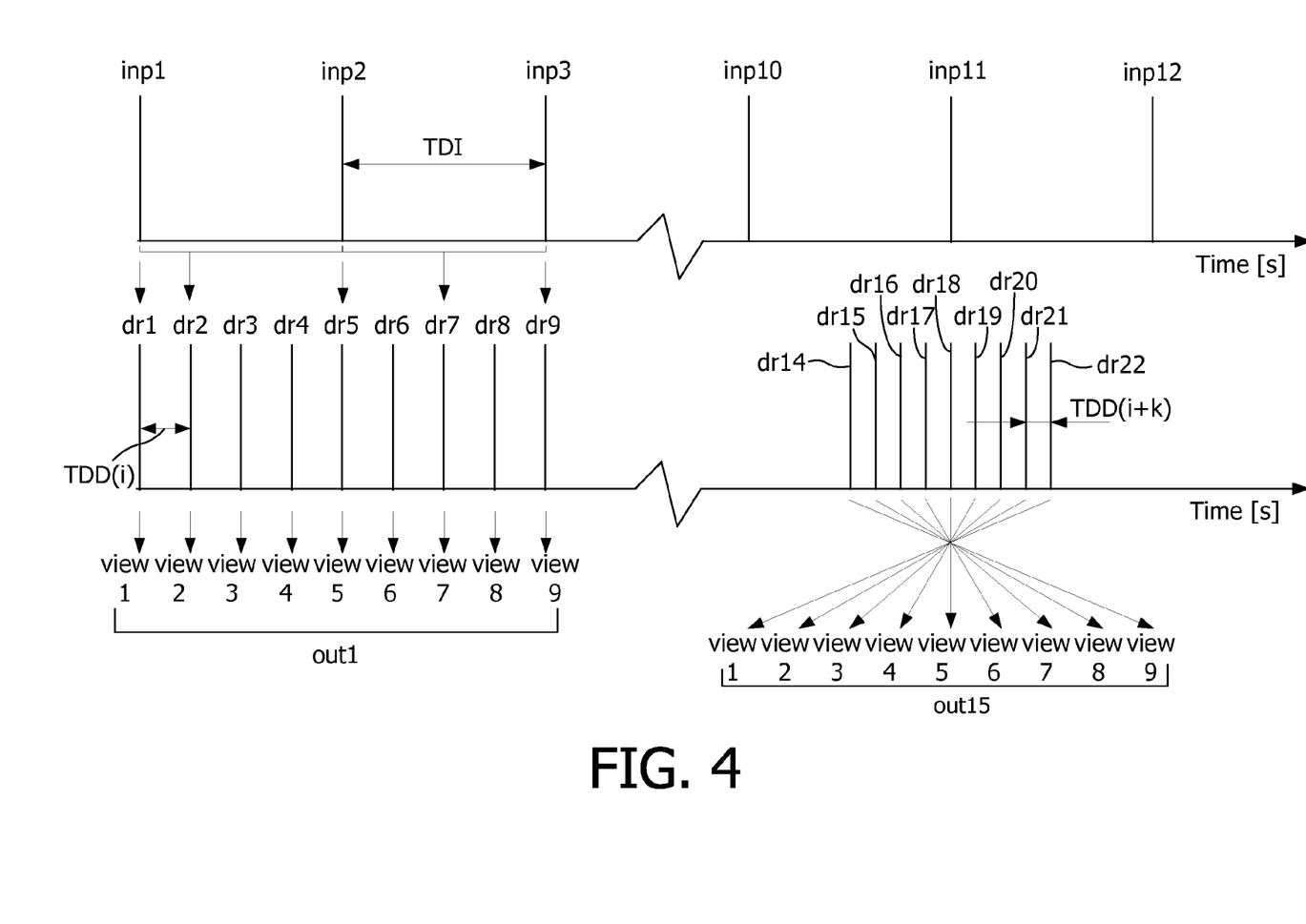
FIG. 4 illustrates the effect of negative TDD(i)

FIG. 4 illustrates the effect of changing sign of TDD(i). The effect is that the mapping changes in order, i.e. first views with a higher number than the central view (cv=5) correspond to temporal positions which are higher than the temporal positions of the central view. (See also Table 6 and also FIG. 6.)

Then for negative values of TDD(i) the views with a higher number than the central view correspond to temporal positions which are lower than the temporal positions of the central view.

Figure 5:
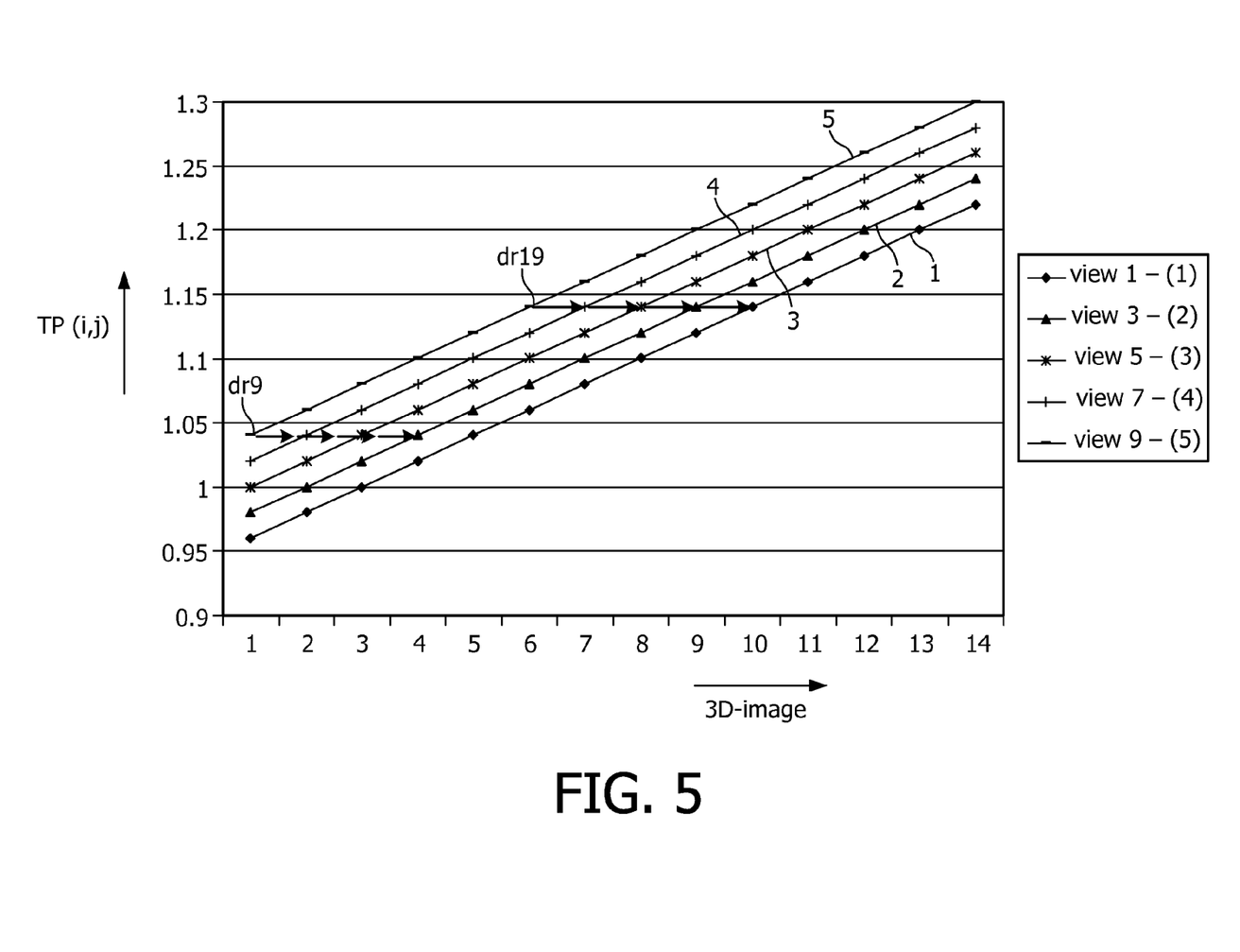
FIG. 5 illustrates the reuse of driving images.

FIG. 5 illustrates the reuse of driving images. The x-axis corresponds to the 3D-images, out1-out14. The y-axis shows the temporal positions TP(i,j) for the driving images mapped to five out of nine views. FIG. 5 clearly illustrates that driving image dr9 having temporal position TP(i, j)=1.04 (see also Table 5) is first used for outp1; view9, then outp2; view 7, then outp3; view5, then outp4; view3 and eventually outp5; view1.

FIG. 5 also illustrates that driving image dr19 having temporal position TP(i, j)=1.14 (see also Table 5) is first used for outp6; view9, then outp7; view 7, then outp8; view5, then outp9; view3 and eventually outp10; view1. See also the description in connection with Table 5 because the plots are derived from Table 5.

FIG. 6 illustrates the effect of changing TDD(i). The x-axis corresponds to the 3D-images, out1-out14. The y-axis shows the temporal positions TP(i,j) for the driving images mapped to three out of nine views. See also the description in connection with Table 6 because the plots are derived from Table 6.

First view9 has driving images having temporal positions which are higher than the temporal positions of the central view, i.e. view5 and view1 has driving images having temporal positions which are lower than the temporal positions of the central view: outp1-outp4.

Then all views have driving images with mutually equal temporal positions: outp5.

Then for negative values of TDD(i) view9 has driving images having temporal positions which are lower than the temporal positions of the central view, i.e. view5 and view1 has driving images having temporal positions which are higher than the temporal positions of the central view: outp6-outp12.

Then all views have driving images with mutually equal temporal positions: outp13.

Finally view9 has driving images having temporal positions which are higher than the temporal positions of the central view and view1 has driving images having temporal positions which are lower than the temporal positions of the central view: outp14.

For a scene where the camera changes motion direction, TDD(i) is preferably reduced slowly, pressing the views temporally together like an accordion, and then is increased again (but the opposite sign). This yields a very smooth, virtually invisible transition between two panning directions. TDD(i) can also be made background motion magnitude dependent, to stabilize the depth impression. Preferably the average size of the motion vectors of the motion vector fields is computed to control the value of TDD(i). Alternatively, only the horizontal components of the motion vectors are used to compute a motion measure for control of TDD(i). Preferably, background motion and foreground motion are determined independently in order to control TDD(i).

A preferred configuration of the multi-view display device is as follows:
  for a background moving from left to right, a positive TDD(i) yields a positive motion parallax for the background (i.e. it falls behind the display screen).
  for a background moving from right to left, a negative TDD(i) yields a positive motion parallax for the background.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etcetera do not indicate any ordering. These words are to be interpreted as names.

The invention claimed is:

1. A method of rendering multiple views for a multi-view display device, the multi-view display device having a number of subsets of light generating elements located in a first plane and optical directory elements associated with the light generating elements that overlay the light generating elements in the first plane of a display screen for displaying respective multiple views of a multi-view image in mutually different directions relative to the multi-view display device, the method comprising:
  computing, via a motion estimation device, a first motion vector field for a first time instance on basis of (i) a first input image of a time sequence of input images and (ii) a second input image of the time sequence of input images;
  computing, via an interpolation device, a sequence of first motion compensated intermediate images on basis of (i) the first motion vector field, (ii) the first input image and/or (iii) the second input image; and
  providing, via a driver device, respective pixel values of the sequence of first motion compensated intermediate images to first subsets of light generating elements of the display screen, wherein an output of each subset of light generating elements renders one of the respective multiple views displayed in the mutually different directions which together form a first multi-view image; the method further comprising:
  providing, via the driver device, the sequence of first motion compensated intermediate images to second subsets of light generating elements of the display screen after a predetermined delay, wherein one or more image of the sequence of first motion compensated intermediate images is reused in creating and displaying a consecutive second multi-view image, and wherein creating the consecutive second multi-view image includes (a) computing a sequence of new motion compensated intermediate images and (b) remapping the one or more image of the sequence of first motion compensated intermediate images as used for the first multi-view image to create respective multiple views of the consecutive second multi-view image, further wherein a particular reused driving image, which includes the reused one or more image of the sequence of first motion compensated intermediate images, is shifted by a configurable view shift VS(i), i=index, from a first view in the first multi-view image to a second view in the consecutive second multi-view image, which is adjacent to the first view; and the method further comprising:

computing, via a processor, for each of the first and second multi-view image, a value of temporal distance TDD(i), Temporal Distance Driving, between adjacent driving images provided to the light generating elements of the display screen for a multi-view image with index i, wherein the computed value of temporal distance TDD (i) is used in mapping driving images to create respective views in a corresponding sequence of driving images for each respective first and second multi-view image, wherein the computed value of temporal distance TDD (i) is based on estimated motion in the time sequence of input images.

2. The method of rendering multiple views as claimed in claim 1, further comprising:

computing, via the motion estimation device, a second motion vector field for a second time instance which is different from the first time instance corresponding to the first motion vector field;

computing, via the interpolation device, a second motion compensated intermediate image on basis of (i) the second motion vector field, (ii) the first input image and/or (iii) the second input image; and providing the second motion compensated intermediate image to a second subset of the number of subsets of light generating elements of the display screen, simultaneously with providing the first motion compensated intermediate image to the first subset of the number of subsets of light generating elements of the display screen.

3. The method of rendering multiple views as claimed in claim 2, further comprising:

computing, via the motion estimation device, a third motion vector field on basis of the second input image and a third input image of the time sequence of input images;

computing, via the interpolation device, a third motion compensated intermediate image on basis of (i) the third motion vector field, (ii) the second input image and/or (iii) a third input image of the time sequence of input images; and providing, via the driver device, the third motion compensated intermediate image to a third subset of the number of subsets of light generating elements of the display screen, simultaneously with providing the first motion compensated intermediate image to the first subset of the number of subsets of light generating elements of the display screen.

4. The method of rendering multiple views as claimed in claim 3, further comprising providing, via the driver device, the first input image to a fourth subset of the number of subsets of light generating elements of the display screen simultaneously with providing the first motion compensated intermediate image to the first subset of the number of subsets of light generating elements of the display screen.

5. The method of rendering multiple views as claimed in claim 4, further comprising providing, via the driver device, the second input image to a fifth subset of the number of subsets of light generating elements of the display screen simultaneously with providing the first motion compensated intermediate image to the first subset of the number of subsets of light generating elements of the display screen.

6. The method of rendering multiple views as claimed in claim 1, wherein a first direction of a first one of the number of subsets of light generating elements of the display screen is perpendicular to a plane of the display screen.

7. The method of rendering multiple views as claimed in claim 1, wherein a current value of temporal distance TDD(i) is based on a previously computed value of temporal distance TDD(i−1).

8. The method of rendering multiple views as claimed in claim 1, wherein the predetermined delay is shorter than a temporal distance between the first and second input image.

9. A multi-view display device having a number of subsets of light generating elements located in a first plane and optical directory elements associated with the light generating elements that overlay the light generating elements in the first plane of a display screen for displaying respective multiple views of a multi-view image in mutually different directions relative to the multi-view display device, the multi-view display device comprising:

a motion estimation device configured to compute a first motion vector field for a first time instance on basis of (i) a first input image of a time sequence of input images and (ii) a second input image of a time sequence of input images;

an interpolation device configured to computer a sequence of first motion compensated intermediate images on basis of (i) the first motion vector field, (ii) the first input image and/or (iii) the second input image; and a driver device configured to provide respective pixel values of the sequence of first motion compensated intermediate images to first subsets of light generating elements of the display screen, wherein an output of each subset of light generating elements renders one of the respective multiple views displayed in the mutually different directions which together form a first multi-view image, the driver device further configured to provide the sequence of first motion compensated intermediate images to second subsets of light generating elements of the display screen after a predetermined delay, wherein one or more image of the sequence of first motion compensated intermediate images is reused in creating and displaying a consecutive second multi-view image, and wherein creating the consecutive second multi-view image includes (a) computing a sequence of new motion compensated intermediate images and (b) remapping the one or more image of the sequence of first motion compensated intermediate images as used for the first multi-view image to create respective multiple views of the consecutive second multi-view image, further wherein a particular reused driving image, which includes the reused one or more image of the sequence of first motion compensated intermediate images, is shifted by a configurable view shift VS(i), i=index, from a first view in the first multi-view image to a second view in the consecutive second multi-view image, which is adjacent to the first view, further comprising:

a processor for computing, for each of the first and second multi-view image, a value of temporal distance TDD(i), Temporal Distance Driving, between adjacent driving images provided to the light generating elements of the display screen for a multi-view image with index=i, wherein the computed value of temporal distance TDD (i) is used in mapping driving images to respective views in a corresponding sequence of driving images for each respective first and second multi-view image, wherein the computed value of temporal distance TDD(i) is based on estimated motion in the time sequence of input images.

10. A non-transitory computer readable medium embodied with a computer program to be loaded by a computer arrangement, comprising instructions to render multiple views for a multi-view display device, wherein the multi-view display device having a number of subsets of light generating elements located in a first plane and optical directory elements associated with the light generating elements that overlay the light generating elements in the first plane of a display screen for displaying respective multiple views of a multi-view image in mutually different directions relative to the multi-view display device, the computer arrangement including processing means and a memory, the computer program, after being loaded, providing said processing means with the capability to carry out:

computing a first motion vector field for a first time instance on basis of (i) a first input image of a time sequence of input images and (ii) a second input image of the time sequence of input images;

computing a sequence of first motion compensated intermediate images on basis of (i) the first motion vector field, (ii) the first input image and/or (iii) the second input image;

providing respective pixel values of the sequence of first motion compensated intermediate images to first subsets of light generating elements of the display screen, wherein an output of each subset of light generating elements renders one of the respective multiple views displayed in the mutually different direction which together form a first multi-view image; and providing the sequence of first motion compensated intermediate images to second subsets of light generating elements of the display screen after a predetermined delay, wherein one or more of the sequence of first motion compensated intermediate images is reused in creating and displaying a consecutive second multi-view image, and wherein creating the consecutive second multi-view image includes (a) computing a sequence of new motion compensated intermediate images and (b) remapping the one or more image of the sequence of first motion compensated intermediate images as used for the first multi-view image to create respective multiple views of the consecutive second multi-view image, further wherein a particular reused driving image, which includes the reused one or more image of the sequence of first motion compensated intermediate images, is shifted by a configurable view shift VS(i), i=index, from a first view in the first multi-view image to a second view in the consecutive second multi-view image, which is adjacent to the first view; and further comprising:

computing for each of the first and second multi-view image, a value of temporal distance TDD(i), Temporal Distance Driving, between adjacent driving images provided to the light generating elements of the display screen for a multi-view image with index=i, wherein the computed value of temporal distance TDD(i) is used in mapping driving images to respective views in a corresponding sequence of driving images for each respective first and second multi-view image, wherein the computed value of temporal distance TDD(i) is based on estimated motion in the time sequence of input images.

* * * * *